United States Patent [19]
Gagliardi, Jr.

[11] Patent Number: 5,976,608
[45] Date of Patent: Nov. 2, 1999

[54] METHOD FOR CUTTING A PORK BUTT TO PROVIDE PORK PRODUCTS WITH ENHANCED VALUE

[75] Inventor: Eugene D. Gagliardi, Jr., Atglen, Pa.

[73] Assignee: Visionary Design, Inc., Atglen, Pa.

[21] Appl. No.: 08/789,507

[22] Filed: Jan. 27, 1997

[51] Int. Cl.⁶ .......................... A22C 17/00; B02C 18/00
[52] U.S. Cl. .................. 426/641; 426/513; 426/518; 426/646; 452/149
[58] Field of Search ...................... 426/645, 129, 426/513, 518, 641, 646; 452/134, 135, 149, 155, 174

[56] References Cited

U.S. PATENT DOCUMENTS

| | | | |
|---|---|---|---|
| 4,344,341 | 8/1982 | Lotz | 83/29 |
| 4,472,448 | 9/1984 | Haggerty et al. | 426/589 |
| 4,728,524 | 3/1988 | Gagliardi, Jr. | 426/272 |
| 5,195,924 | 3/1993 | Gagliardi, Jr. | 452/149 |
| 5,667,436 | 9/1997 | Gagliardi, Jr. | 452/149 |

OTHER PUBLICATIONS

Miller, S.G., Proceedings 28th Annual Reciprocal Meat Conference of the American Meat Science Association, National Live Stock and Meat Board, Jun. 1975.

Rhee et al., Journal of Food Science, vol. 53, No. 2, pp. 388–390, 1988.

*Primary Examiner*—Donna C. Wortman
*Assistant Examiner*—Brenda G. Brumback
*Attorney, Agent, or Firm*—Panitch Schwarze Jacobs & Nadel, P.C.

[57] ABSTRACT

A method for cutting a pork butt to provide pork products having substantially enhanced value involves first removing the blade bone from the pork butt. The principal shoulder muscles of the pork butt are located and identified and one or more seams extending around portions of at least one of the muscles is cut to remove at least one principal shoulder muscle from the remainder of the pork butt. The removed shoulder muscle is denuded by removing substantially all cartilage, fat, connective tissue, membrane, and other non-muscle material from each outer surface to provide essentially a solid pork muscle. The denuded shoulder muscle is cut into one or more generally solid pork products, each pork product being very low in fat content and of relatively high economic value. Each of the pork products is tenderized prior to being offered for sale.

6 Claims, 7 Drawing Sheets

METHOD FOR CUTTING A PORK BUTT TO PROVIDE PORK PRODUCTS WITH ENHANCED VALUE

BACKGROUND OF THE INVENTION

The present invention relates generally to a method of cutting an animal carcass into edible meat products and, more particularly, to a method of cutting a pork butt into pork products which are relatively high in economic value.

The butchering and dressing of animals, such as hogs, pigs, and other swine (hereinafter referred to as pork), for the purpose of producing edible meat or pork products is generally well known. Typically, such animals are butchered or otherwise processed into numerous well known meat products such as pork roasts, hams, spare ribs, bacon, sausage, or the like. Typically, a side or quarter of pork is butchered by a meat cutter cutting or otherwise removing from the side or quarter as many "high value" pork products as feasible using a knife, saw, and/or other standard meat processing equipment. Such high value pork products, which are generally comprised of substantially solid or near solid pork muscles, include roasts, hams, and the like. Typically, once all such relatively high value cuts or pork products are removed from the pork side or quarter, the products are further processed by deboning, trimming, cleaning, and the like, and are thereafter cured or otherwise processed, wrapped, and sold for relatively high per pound prices. The other, less desirable or lower value components of the pork side or quarter are also removed from any remaining bones and, along with components trimmed from the higher value pork products, are typically placed into a meat grinder or similar equipment and are ground up for making ground pork or other less expensive pork products, such as pork sausage. The quality of the ground pork or other such less expensive pork products depends upon the source of the components being placed in the meat grinder, the amount of fat and/or other less desirable materials present in the components placed in the grinder, and other factors. However, the per pound price of the ground pork or other such products made from the ground pork is substantially less than the per pound price of the higher value pork products described above.

As the cost of bringing pork to market has steadily increased, a need has arisen for obtaining enhanced value from the pork. One way to provide such enhanced value is to reduce the amount of the pork components placed in a meat grinder or otherwise used for low value pork products. The present invention comprises a method of cutting a pork butt or the tip of a pork shoulder blade to provide new pork products having substantially enhanced value over the prior usage of such pork components.

As is well known to those of ordinary skill in the art, the pork butt generally comprises a portion of the shoulder of the animal and is generally not considered to be suitable for high quality pork products because it is not a large solid muscle. Instead, a pork butt contains an irregularly shaped blade bone as well as fat, many seams, membranes, cartilage, and other non-muscle components so that in the past the pork butt was typically used only for the purpose of forming ground pork, sausage, or other less expensive pork products. The present invention comprises a method of removing from a pork butt one or more shoulder muscles, each of which comprises substantially solid pieces of pork meat with minimal fat, cartilage, membrane, or other non-muscle components. Each such shoulder muscle may thereafter be cut into high quality pork products which may be sold at relatively high per pound prices, particularly when compared to the prices of ground pork or pork sausage. Because of the relatively high pork muscle low fat content, each such pork product is considered to be "heart healthy". In utilizing the method of the present invention, the amount of pork which must be put into a grinder, formed into sausage or other low value pork products, is substantially reduced, thereby enhancing the overall economic value of the pork.

SUMMARY OF THE INVENTION

Briefly stated, the present invention comprises a method for cutting a pork butt to provide pork products having substantially enhanced value. The method includes removing the blade bone from the pork butt and thereafter locating and identifying the principal shoulder muscles of the butt. At least one of the shoulder muscles is removed from the remainder of the butt by cutting along one or more seams extending through the butt and around portions of the at least one shoulder muscle. The removed shoulder muscle is then denuded by removing substantially all cartilage, fat, connective tissue, membrane, and other non-muscle material from each outer surface thereof to provide essentially a solid pork muscle. The denuded pork muscle is then cut into one or more generally solid pork products, each such pork product being very low in fat content and of relatively high economic value. Finally, each such pork product is tenderized.

BRIEF DESCRIPTION OF THE SEVERAL VIEWS OF THE DRAWINGS

The foregoing summary, as well as the following detailed description of presently preferred embodiments of the invention, will be better understood when read in conjunction with the appended drawings. For the purpose of illustrating the invention, there are shown in the drawings embodiments which are presently preferred. It should be understood, however, that the present invention is not limited to the particular arrangements and instrumentalities shown. In the drawings.

DETAILED DESCRIPTION OF THE INVENTION

Figure 1:
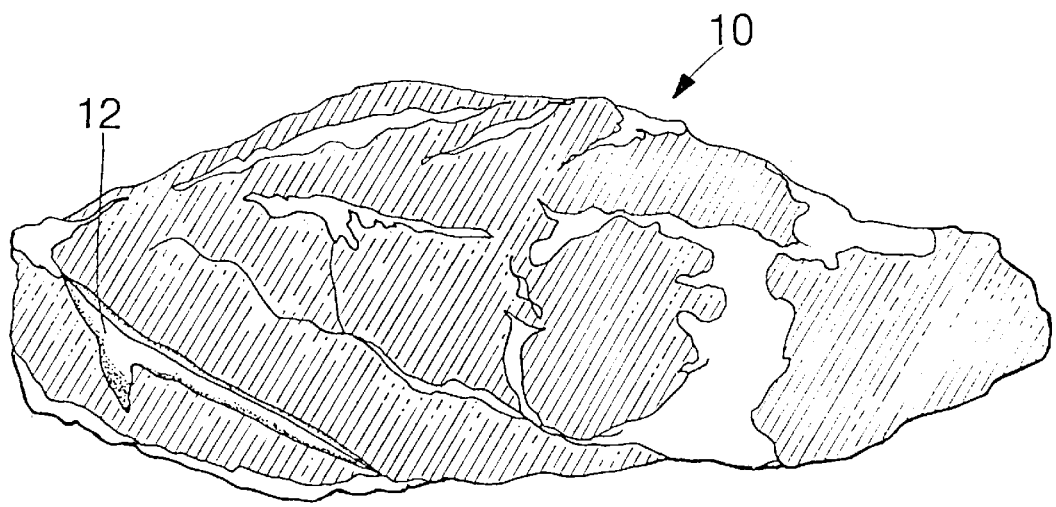
FIG. 1 is a perspective view of a pork butt for use with the present method in providing pork products with enhanced value.

Referring in detail to the drawings, wherein like numerals are used to indicate the same elements throughout the several figures, there is shown in FIG. 1 a perspective view of a pork butt 10. The pork butt 10 comprises the tip of the shoulder blade of the animal but does not include the leg bone or any of the leg and also does not include any portion of the neck of the animal. The pork butt 10 is a portion of the animal which is well known to those of ordinary skill in the art. The pork butt 10 as shown in FIG. 1 includes at least a portion of the shoulder blade bone 12 in a manner typical of a pork butt.

As discussed generally above, the pork butt 10 as shown is not presently considered to be high quality pork because it contains fat, many seams, cartilage, membrane, etc., so that the pork butt 10 as it stands is not very tender nor is it susceptible to being sold as a single meat product. In the prior art, the pork butt 10 would generally be used only for being placed in a meat grinder to produce ground pork for use in sausage and other products suitable for the inclusion of ground pork. For example, some users mix ground pork with ground deer meat to provide a ground meat product which is more tender and less gamey than deer meat by itself. The use of the pork butt 10 for forming ground pork is considered to be a low value use since the ground pork and other products made from the ground pork are typically sold at wholesale and/or at retail for relatively low per pound prices. The present invention comprises a new method for significantly enhancing the economic value of the pork butt 10 by providing one or more high quality pork products which can be sold at substantially higher per pound prices than the prior art ground pork products typically produced from the pork butt 10. Essentially, the present invention comprises a method of removing from the pork butt 10 one or more muscles which comprise substantially solid pieces of meat without significant fat, cartilage, membrane, etc., and which thereafter may be made into high quality pork products and sold at relatively high per pound prices, at least relative to the per pound price of ground pork. Because of the relatively high pork, low fat content of such pork products, these products can be considered to be "heart healthy".

The following description sets forth preferred methods for practicing the present invention with respect to a pork butt 10, including a blade bone 12, which has been initially removed from a side or front quarter of an animal. It will be appreciated by those of ordinary skill in the art that the present invention has equal applicability to related pork products. For example, the present invention is equally applicable with respect to a pork butt which does not initially contain a blade bone and may also be applicable to other animals which may include a portion similar in configuration to the pork butt 10. Thus, while the following description relates specifically to the pork butt 10 as illustrated, the invention is not so limited.

Figure 2:
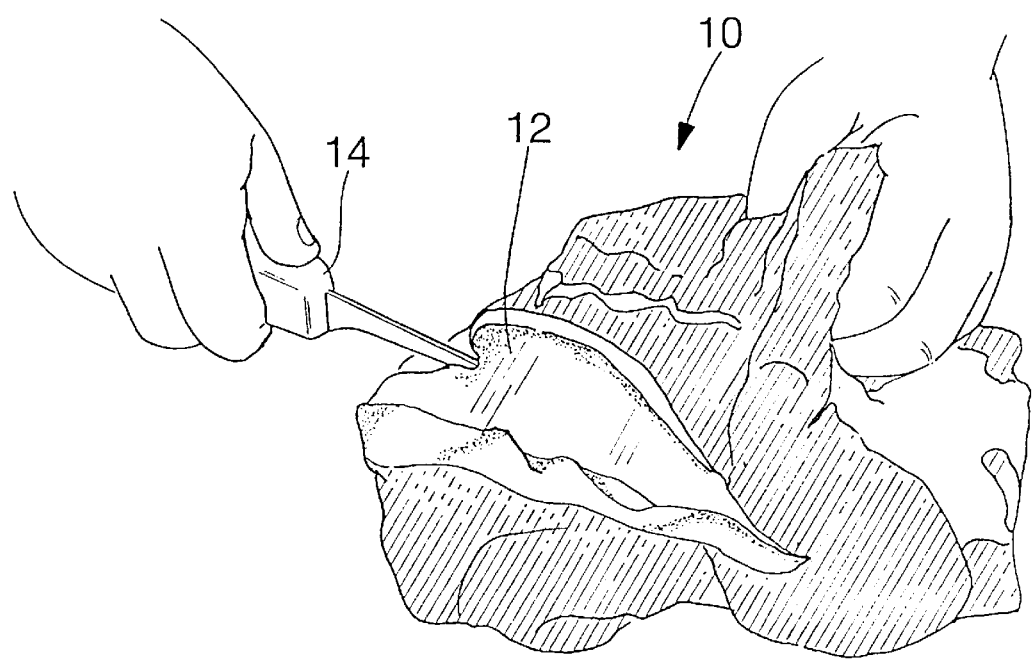
FIG. 2 is a perspective view of the pork butt of FIG. 1 illustrating removal of the shoulder bone.

As best illustrated in FIG. 2, the first step in the method of the present invention is to remove the blade bone 12 from the remainder of the pork butt 10. The blade bone 12 is preferably removed in the manner illustrated by utilizing a sharp tool to effectively cut between the blade bone 12 and the surrounding meat as close as possible around the edges and the major surfaces of the blade bone 12 so that the blade bone 12 may be separated from the remainder of the pork butt 10 without taking with it any significant quantity of meat. Preferably, the blade bone 12 is removed from the remainder of the pork butt 10 utilizing a sharp boning knife 14 which is moved along all of the major surfaces of the blade bone 12 in a manner well known to those of ordinary skill in the art. As the boning knife 14 is moved along the blade bone 12, the remainder of the pork butt 10 is preferably grasped and pulled away from the blade bone 12 to facilitate further cutting. While it is preferable that the blade bone 12 be removed from the butt 10 as essentially a single piece, it will be appreciated by those of ordinary skill in the art that the blade bone 12 could be cut into two or more individual bone portions which could be separately removed. It will also be appreciated by those of ordinary skill in the art that while the presently preferred method of removing the blade bone 12 involves effectively cutting out the blade bone 12 utilizing a boning knife 14, other apparatus or methods, such as a mechanical device (not shown), could be employed for removal of the blade bone 12. Accordingly, the present invention is not limited to manual removal of the blade bone 12 utilizing a boning knife 14.

Figure 3:
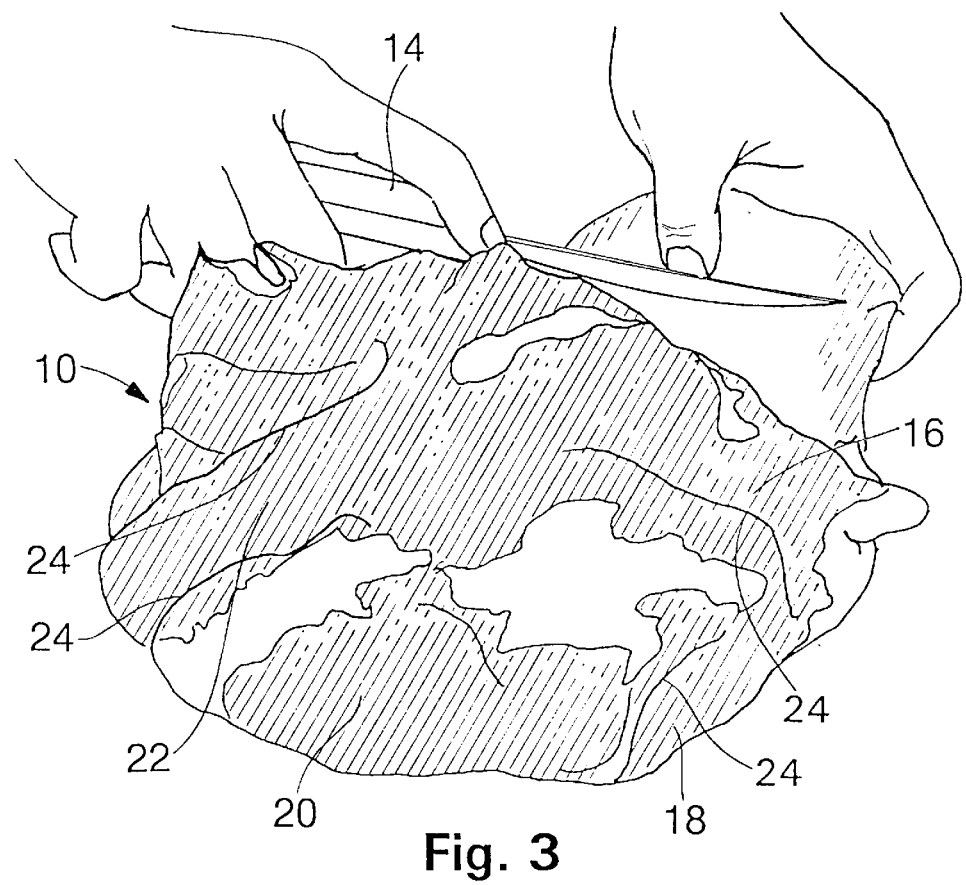
FIG. 3 is a perspective view of the pork butt of FIG. 1 showing removal of one of the principal muscles.

Once the blade bone 12 has been removed, the pork butt 10 is preferably oriented as shown in FIG. 3 so that the person (or people) performing the method is able to locate and identify the principal muscles of the pork butt 10. More particularly, the person should be able to clearly locate the various seams separating the principal muscles from each other. As is well known to those of ordinary skill in the art, the pork butt 10 includes four principal muscles. A first muscle 16 (Supraspinatus), a second muscle 18 (Infraspinatus), a third muscle 20 (Triceps Brachii Input Longum), and a fourth muscle 22 (Serratus Ventralis). It is these four principal muscles 16, 18, 20, 22 which in accordance with the present invention are separated from the remainder of the pork butt 10 to provide the enhanced value pork products as hereinafter discussed. It will be appreciated by those of ordinary skill in the art that there are additional, smaller muscles or areas of meat (not shown) present in the pork butt 10. However, the additional, smaller muscles or meat areas are considered to be too small to be efficiently used to create additional enhanced value pork products. In addition, the labor costs involved in extracting such smaller muscles or meat areas are too high to justify their individual removal.

As best shown in FIG. 3, the four muscles 16, 18, 20, 22 are surrounded at least in part by a series of seams 24. The seams 24 are essentially formed of cartilage, membranes, connective tissue, and other such materials which hold together the four muscles 16, 18, 20, 22 as well as holding the four muscles together with the remainder of the pork butt 10. The four muscles 16, 18, 20, 22 are removed by effectively individually grasping and cutting along the seams 24 extending around each muscle. Preferably, the cutting is accomplished utilizing a relatively sharp boning knife 14. However, it will be appreciated by those of ordinary skill in the art that some other type of knife or other sharp tool (not shown) may alternatively be employed. It will also be appreciated by those of ordinary skill in the art that some other mechanical or other apparatus may be employed in removing one or more of the muscles 16, 18, 20, 22 from the remainder of the pork butt 10. As each cut is made along a seam 24, the respective muscle is pulled away from the remainder of the pork butt 10 to facilitate further cutting of the seam 24 around the muscle in a manner well known in the art. Once the seams 24 surrounding each muscle have been cut, each of the muscles 16, 18, 20, 22 effectively falls away from the remainder of the pork butt 10.

As discussed above, because the muscles and other meat areas remaining in the pork butt 10 after the four principal muscles 16, 18, 20, 22 have been removed are small, the remainder of the pork butt 10 is useful primarily for forming ground pork. Alternatively, the remainder of the pork butt 10 can be fed through a slotted plate positioned on the output of a meat grinder (see FIG. 9) to produce ribbon-like pork products in a manner as shown and described in co-pending U.S. patent application Ser. No. 08/611,913 entitled "Plate For Use On The Outlet Of A Food Grinder And Method Of Preparing Food Product Utilizing The Plate", which is incorporated herein by reference.

Figure 4:
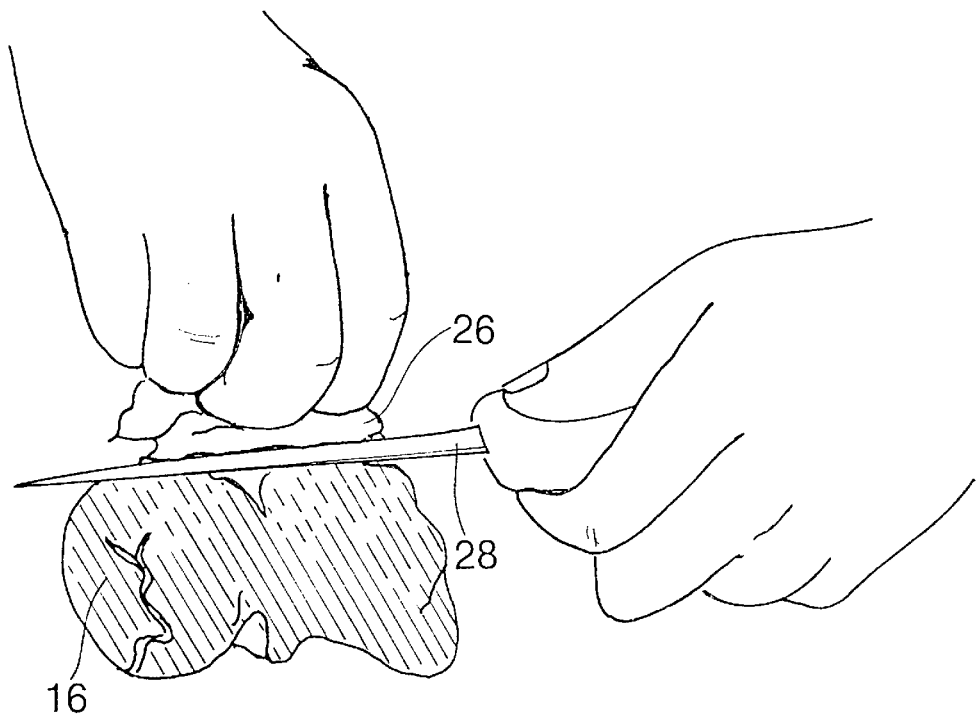
FIG. 4 is a perspective view of a removed muscle illustrating removal of the silver.

The next step in the method of the present invention is to denude each of the four principal muscles 16, 18, 20, 22 by removing from each muscle any remaining cartilage, membrane, fat, and other non-meat tissue, generally referred to as silver 26, which is present on each of the outer surfaces thereof. FIG. 4 illustrates removal of the silver 26 from the outer surface of the first muscle 16. Preferably, the silver 26 is removed from each of the muscles 16, 18, 20, 22 by effectively cutting the silver 24 from the muscle utilizing a sharp boning knife 28. Because the fat and other components of the silver 26 tightly adheres to the muscle tissue, it may be necessary to remove some portion of the muscle 16 during the denuding process. Preferably, all of the silver 26 and any muscle attached thereto is also thrown into the meat grinder or is passed along with the remainder of the pork butt 10 through the slotted plate in the manner as discussed above. It will be appreciated by those of ordinary skill in the art that any other type of sharp knife or other suitable sharp instrument could alternatively be employed for removing the silver 26 from the muscles 16, 18, 20, 22. The silver 26 could also be removed in an automated or semi-automated manner, for example, by using a mechanical skinner apparatus or the like. Preferably, the silver 26 is removed from all sides of each of the muscles 16, 18, 20, 22 resulting in four muscles which are effectively pure solid pieces of pork meat. Because the amount of fat, gristle, membrane, etc., in the four denuded muscles 16, 18, 20, 22 is very low, each of the muscles 16, 18, 20, 22 qualifies as being "heart healthy". The removed silver is placed in a grinder with the remainder of the pork butt 10.

Each of the four denuded principal muscles 16, 18, 20, 22 may thereafter be made into a variety of pork products, each of which has a relatively high retail value, particularly as compared to the value of ground pork, the standard prior use of the pork butt 10. Preferably, each of the denuded muscles 16, 18, 20, 22 or the resulting pork products are subjected to a tenderizing process prior to being offered for sale. The preferred tenderizing process involves subjecting the muscles or the pork products to jacquard needle tenderizing (not shown) in a manner well known to those of ordinary skill in the art. However, it will be appreciated that any other suitable mechanical or non-mechanical tenderizing process may alternatively be employed.

For the purpose of describing the various pork products, only pork products made from the first denuded muscle 16 will hereinafter be discussed. However, it will be appreciated that the same or substantially the same pork products could be made from the second, third, and/or fourth denuded muscles 18, 20, 22. The fact that the pork products are being described as being made only from one of the denuded muscles 16 is merely for the purpose of keeping the following description as brief as possible.

Figure 5:
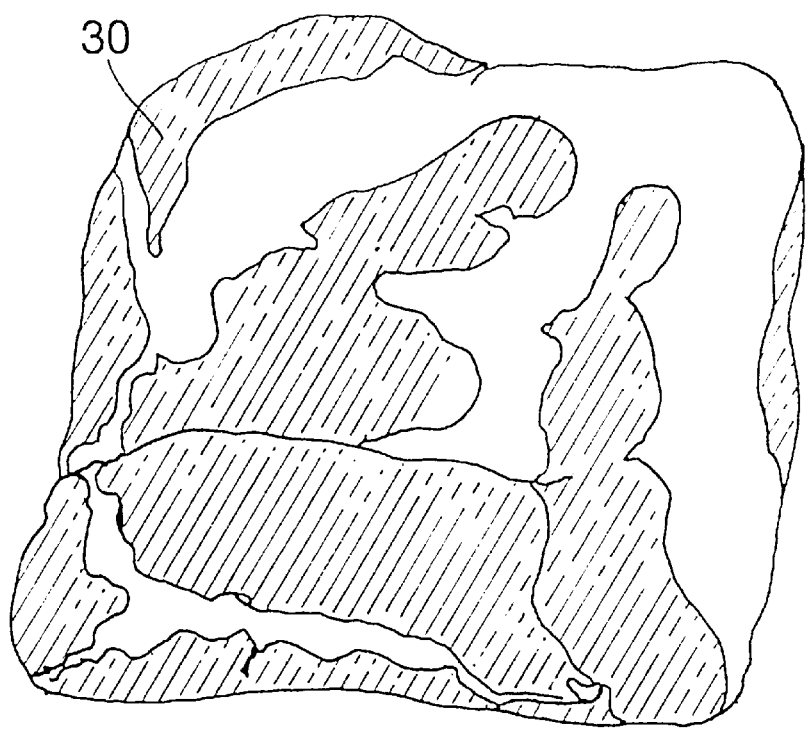
FIG. 5 is an enlarged view of the removed muscle shown in FIG. 4.
Figure 6:
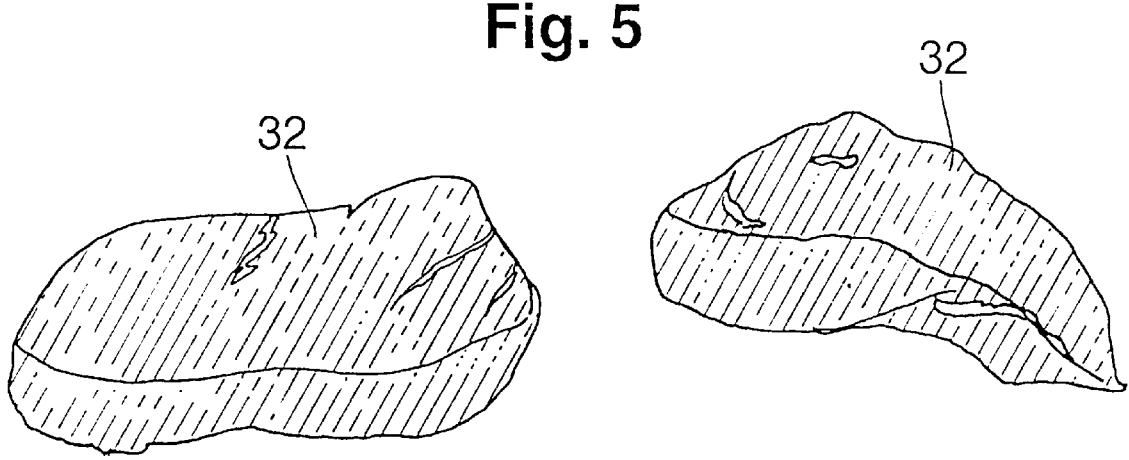
FIG. 6 is a perspective view of the muscle of FIG. 4 cut into two pieces.

A first pork product results from utilizing substantially the entire denuded first muscle 16 as a london broil 30 as shown in FIG. 5 or from slicing the denuded first muscle 16 in half lengthwise to provide two smaller sized london broils 32 as shown in FIG. 6. As discussed above, the large london broil 30 or smaller london broils 32 are boneless and are considered to be heart healthy. Preferably, the london broil 30 or london broils 32 are cooked on a grill or are rotisserie oven roasted. However, it will be appreciated that other ways of cooking a london broil may alternatively be employed. A cottage butt or CT butt may alternatively be formed by squaring off the first muscle 16.

Figure 8:
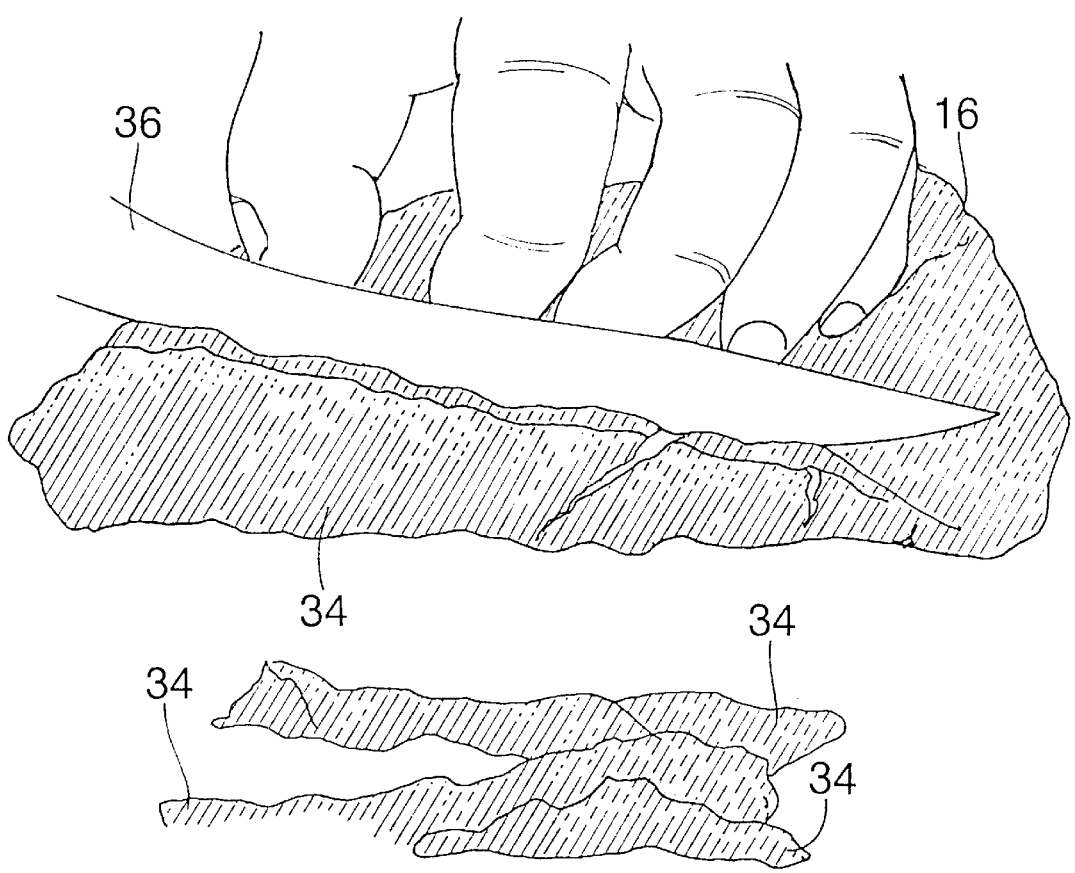
FIG. 8 is a perspective view of the muscle of FIG. 4 being cut into strips.

Alternatively, as illustrated by FIG. 8, the denuded first muscle 16 may be cut into a plurality of strips 34 of variable length, each strip 34 preferably having a thickness in the range of from two to six millimeters. The cutting of the denuded first muscle 16 into the strips 34 may be accomplished utilizing a boning knife 36, as illustrated, a mechanical stripper (not shown), or in any other manner known to those of ordinary skill in the art. The pork strips 34 may thereafter be vacuum tumbled or otherwise marinated (not shown) in a liquid barbecue sauce, or some other suitable marinade, in a manner well known to those skilled in the art. Thereafter, the marinated pork strips 34 may be breaded, battered, or breaded and battered (not shown) in a manner well known to those skilled in the art utilizing a dry vinaigrette based barbecue sauce or some other suitable sauce. The marinated, breaded/battered pork strips are thereafter deep fat fried in a manner well known to those skilled in the art just prior to being consumed.

Figure 7:
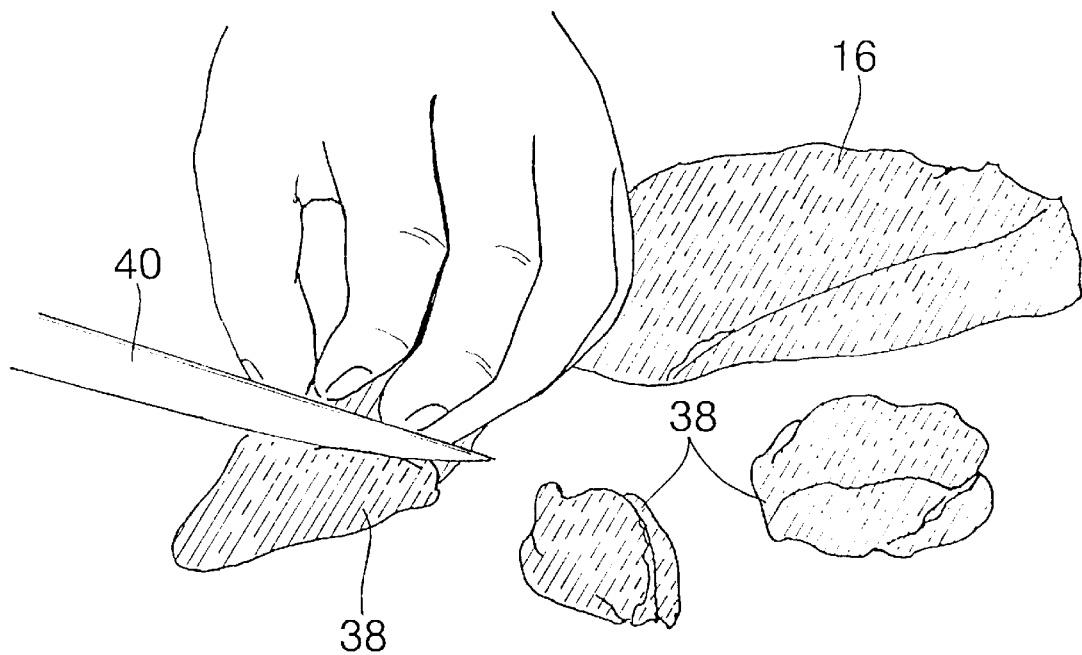
FIG. 7 is a perspective view of the muscle of FIG. 4 being cut into cubes.

As a second alternative, as shown in FIG. 7, the denuded first muscle 16 may be cut into a plurality of bite-sized cubes 38 using a knife 40 as shown or in any other suitable manner known to those skilled in the art. Each of the cubes 38 are thereafter needle injected in a manner well known to those skilled in the art with a barbecue or other suitable seasoning or sauce. The injected pork cubes may thereafter be oven roasted with a barbecue or other sauce in order to provide bite-sized pork tenders.

Figure 10:
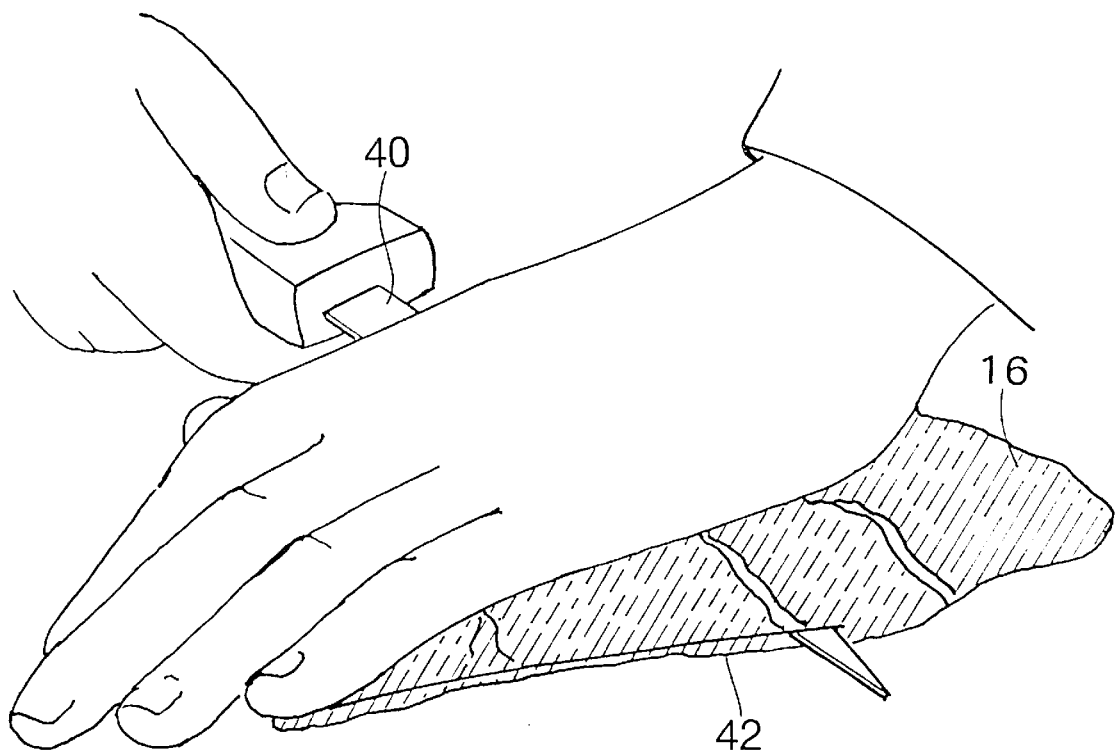
FIG. 10 is a perspective view of the muscle of FIG. 4 being cut lengthwise.
Figure 11:
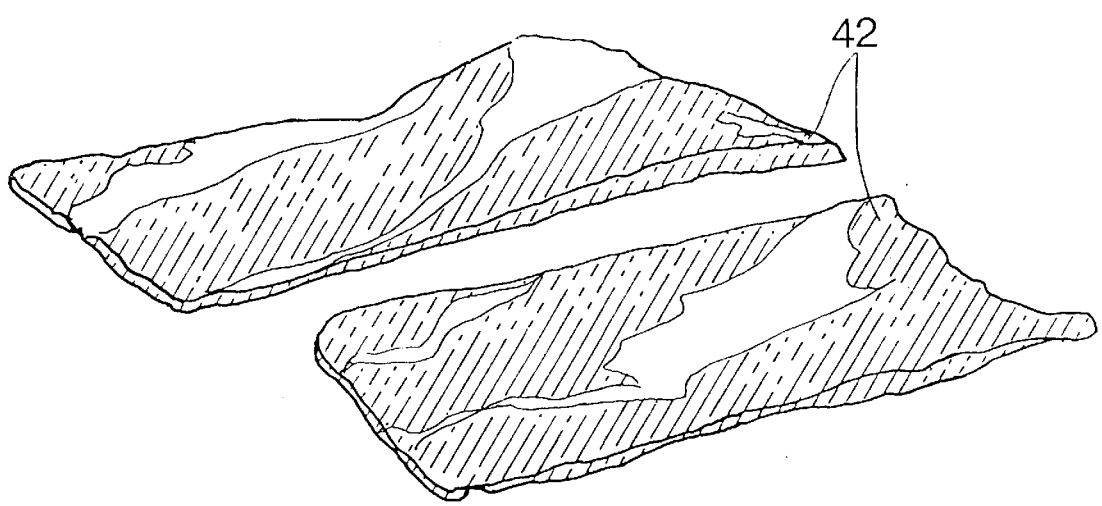
FIG. 11 is a perspective view of two generally flat meat portions obtained from the cutting step shown in FIG. 10.
Figure 12:
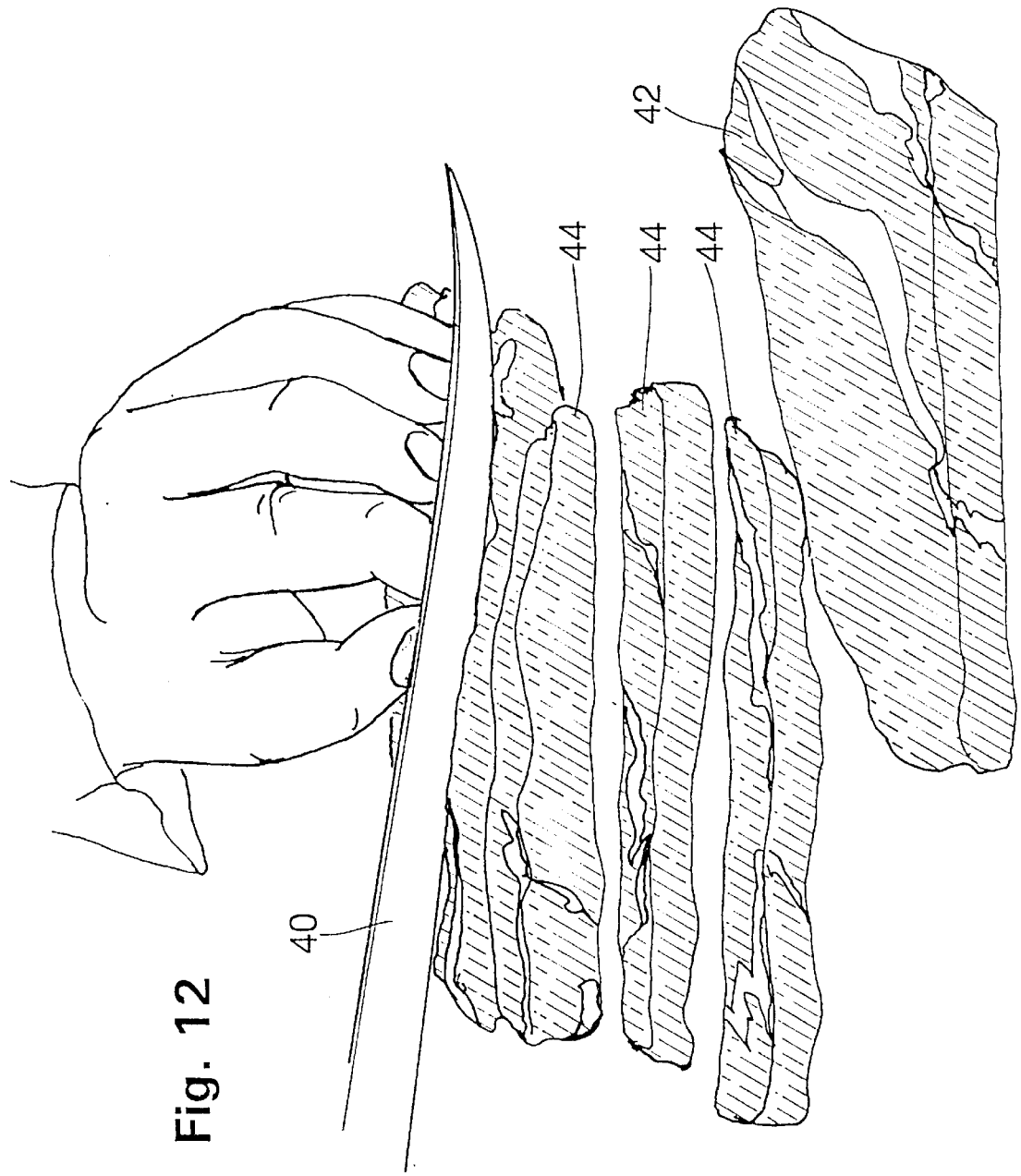
FIG. 12 is a perspective view of one of the meat portions of FIG. 11 being cut into pork strips.

As another alternative, the denuded first muscle 16 can be sliced lengthwise as shown in FIGS. 10 and 11 into slices 42 having a thickness in the range of between one-fourth inch and one-half inch. The resulting slices 42, which preferably are sized for bread or a roll, are then injected with a liquid barbecue or other sauce and are used for making a barbecued "ribless" pork sandwich. Alternatively, the slices 42 can thereafter be cut into strips 44 as shown in FIG. 12 having a width of one-eighth of an inch or more. The strips 44 can then be oven roasted with a barbecue sauce to provide essentially a boneless pork rib product.

Figure 9:
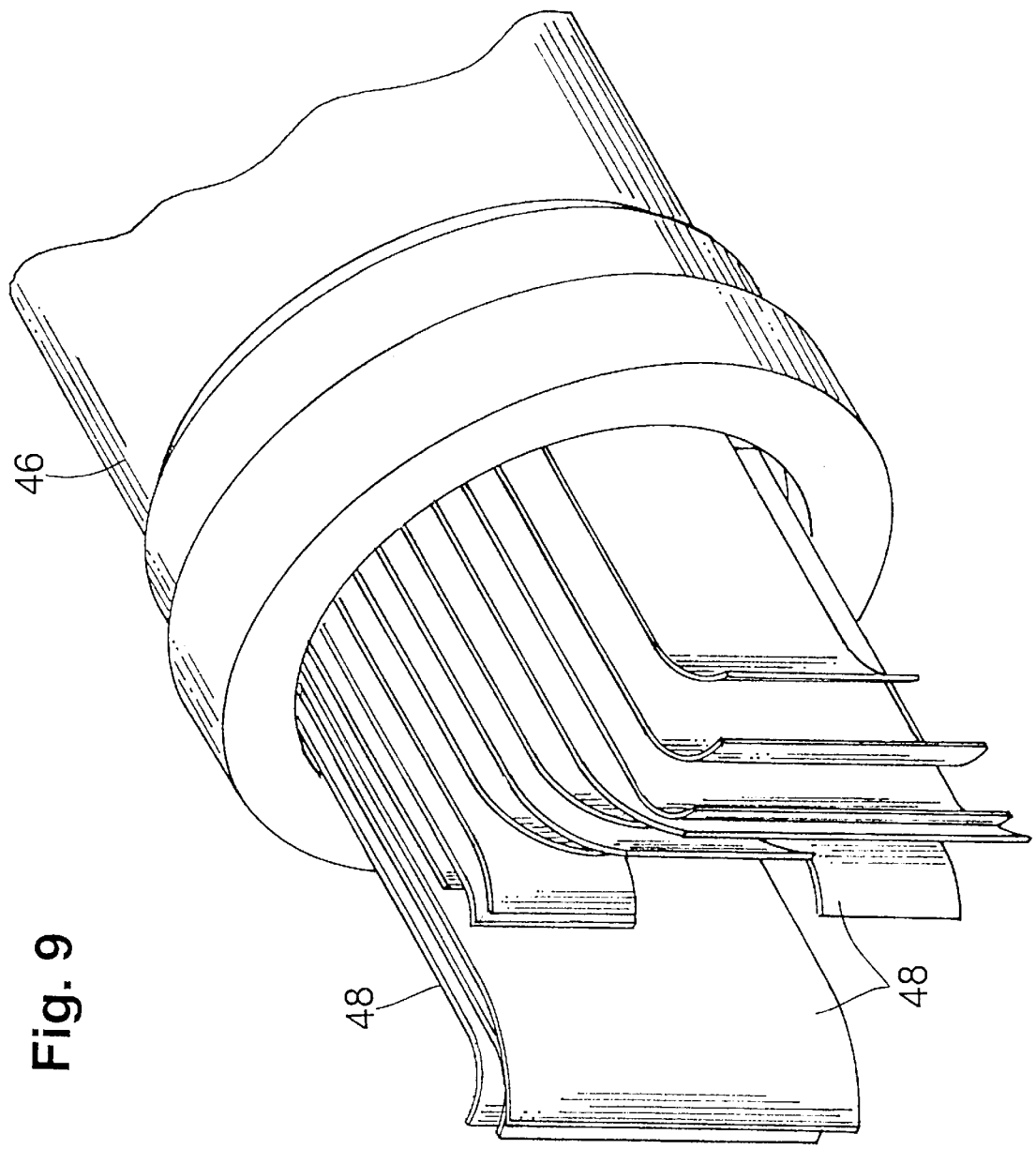
FIG. 9 is a perspective view of the output of a slotted plate meat grinder showing ribbons of pork meat emerging therefrom.

As a further alternative, the denuded first muscle 16 could be cut into a series of thin slices (not shown) for the purpose of forming pork chip steaks. Alternatively, the denuded first muscle may be fed through a slotted plate on a meat grinder 46 as shown in FIG. 9 to provide essentially boneless, generally solid pork ribbons 48 which may thereafter be placed into a hot sauce (not shown), such as a barbecue sauce, to form a pork and sauce product which can be served either by itself or over some other product, such as a bread, rice, noodles, etc. Because the pork ribbons 48 are preferably very thin, the heat of the sauce is sufficient to actually "cook" the pork ribbons 48. In addition to a barbecue sauce, some other sauce such as pork gravy, a cajun sauce, an oriental sauce, etc., could be alternatively employed.

It will be appreciated by those of ordinary skill in the art that the above-described method is highly effective in converting what would normally be relatively low per pound ground pork into a series of relatively high per pound priced pork products. The high priced pork products resulting from the present invention are boneless and are generally considered to be "heart healthy" because they contain only a minimum amount of fat, gristle, or other less desirable components. The present invention can thus be employed for adding substantial economic value to a pork butt 10.

Certain modifications or other changes may be made to the above-described embodiments without departing from the scope and spirit of the present invention. Accordingly, the present invention is not limited to any of the embodiments described above, but instead, is intended to include all such modifications or changes which are within the scope and spirit of the appended claims.

What is claimed is:

1. A method for cutting a pork butt to provide pork products, the method comprising:

removing the blade bone from the butt;

locating and identifying the principal shoulder muscles of the butt;

cutting along one or more seams extending through the butt and around portions of at least one of the shoulder muscles to remove at least one principal shoulder muscle from the remainder of the butt;

denuding the removed shoulder muscle by removing all cartilage, fat, connective tissue, membrane, and other non-muscle material from each outer surface thereof to provide a solid pork muscle; and feeding the denuded shoulder muscle through a meat grinder having an output plate which includes a plurality of elongated slot-like openings such that the ground pork emerging from the output plate comprises a plurality of relatively thin ribbon-like strips, the strips thereafter being placed in a hot sauce.

2. A pork product made in accordance with the method of claim 1.

3. The method as recited in claim 1 wherein the hot sauce comprises pork gravy and the pork products thus formed comprise sliced pork and gravy.

4. The method as recited in claim 1 wherein the hot sauce comprises barbecue sauce and the pork product thus formed comprises sliced pork and barbecue sauce.

5. A method for cutting a pork butt to provide pork products, the method comprising:

removing the blade bone from the butt;

locating and identifying the principal shoulder muscles of the butt;

cutting along one or more seams extending through the butt and around portions of at least one of the shoulder muscles to remove at least one principal shoulder muscle from the remainder of the butt;

denuding the removed shoulder muscle by removing all cartilage, fat, connective tissue, membrane, and other non-muscle material from each outer surface thereof to provide essentially a solid pork muscle;

cutting the denuded shoulder muscle into one or more solid pork products, each such pork product being very low in fat content; and feeding the remainder of the butt and all of the removed cartilage, fat, connective tissue, membrane, and other non-muscle material removed from the shoulder muscles through a meat grinder having an output plate which includes a plurality of elongated slot-like openings such that the ground material emerging from the output plate comprises a plurality of relatively thin ribbon-like strips, the strips thereafter being mixed and cavity filled or extruded to form a restructured boneless pork product resembling a pork rib.

6. The pork product made in accordance with the method of claim 5.

* * * * *